(12) United States Patent
Hudin

(10) Patent No.: US 11,307,714 B2
(45) Date of Patent: Apr. 19, 2022

(54) AREAL DEVICE OFFERING IMPROVED LOCALIZED DEFORMATION

(71) Applicant: COMMISSARIAT A L'ENERGIE ATOMIQUE ET AUX ENERGIES ALTERNATIVES, Paris (FR)

(72) Inventor: Charles Hudin, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/955,983

(22) PCT Filed: Dec. 20, 2018

(86) PCT No.: PCT/FR2018/053478
§ 371 (c)(1),
(2) Date: Jun. 19, 2020

(87) PCT Pub. No.: WO2019/122762
PCT Pub. Date: Jun. 27, 2019

(65) Prior Publication Data
US 2021/0072861 A1 Mar. 11, 2021

(30) Foreign Application Priority Data

Dec. 21, 2017 (FR) .................................... 17 62877
Jun. 13, 2018 (FR) .................................... 18 55186

(51) Int. Cl.
G06F 3/043 (2006.01)
G06F 3/01 (2006.01)
G06F 3/041 (2006.01)

(52) U.S. Cl.
CPC ............ *G06F 3/0433* (2013.01); *G06F 3/016* (2013.01); *G06F 3/0414* (2013.01); *G06F 3/0418* (2013.01)

(58) Field of Classification Search
CPC .................. G06F 3/043; G06F 3/0416; G06F 2203/04106; G06F 3/0412; G06F 3/0436; G06F 3/016; G06F 3/017; G06F 3/042
See application file for complete search history.

(56) References Cited

U.S. PATENT DOCUMENTS 5,638,022 A * 6/1997 Eatwell ............ G10K 11/17855
327/551
8,583,401 B2 * 11/2013 Chang ................. G06F 3/04182
702/150

(Continued)

OTHER PUBLICATIONS

U.S. Appl. No. 16/498,874, filed Sep. 27, 2019, US 2020/0050356 A1, Charles Hudin.

(Continued)

*Primary Examiner* — Olga V Merkoulova
(74) *Attorney, Agent, or Firm* — Oblon, McClelland, Maier & Neustadt, L.L.P.

(57) ABSTRACT

Tactile interface comprising a panel (1) having an interactive surface (2) with one or a plurality of exterior elements, comprising a plurality of interactive areas (Z1, Z2, Z3, Z4) arranged relative to one another, such that they cover substantially the whole of the interactive surface (2) and a plurality of actuators (A1, A2, A3, A4) in contact with the panel, control means (6) of actuators configured to send control signals to the actuators, comprising means for calculating (8) said control signals, said calculating means (8) executing an inverse filtering operation, so as to emit, from a desired displacement or displacements of one or more interactive areas (Z1, Z2, Z3, Z4), control signals compensating at least partially the distortion, reverberation and propagation of waves.

23 Claims, 8 Drawing Sheets

(56) References Cited

U.S. PATENT DOCUMENTS

| | | | | |
|---|---|---|---|---|
| 10,129,646 | B2* | 11/2018 | Choi | H04R 9/066 |
| 10,237,656 | B2* | 3/2019 | Lee | H04R 1/26 |
| 2001/0006006 | A1* | 7/2001 | Hill | G06F 3/0433 |
| | | | | 73/606 |
| 2001/0017502 | A1* | 8/2001 | Kappel | H01L 41/273 |
| | | | | 310/328 |
| 2003/0066692 | A1* | 4/2003 | Devige | B32B 17/10761 |
| | | | | 178/18.04 |
| 2004/0160118 | A1* | 8/2004 | Knollenberg | G02B 26/06 |
| | | | | 303/113.1 |
| 2004/0160421 | A1* | 8/2004 | Sullivan | G06F 3/043 |
| | | | | 345/173 |
| 2007/0002029 | A1* | 1/2007 | Iso | G06F 1/1616 |
| | | | | 345/173 |
| 2011/0090167 | A1* | 4/2011 | Harris | G06F 3/043 |
| | | | | 345/173 |
| 2014/0006291 | A1 | 3/2014 | Yeo | |
| 2015/0177480 | A1* | 6/2015 | Bullock | H01L 41/0986 |
| | | | | 359/512 |
| 2015/0277565 | A1 | 10/2015 | Harris | |
| 2016/0144404 | A1* | 5/2016 | Houston | H02K 7/061 |
| | | | | 318/114 |
| 2017/0001599 | A1* | 1/2017 | Bullock | H05B 1/0252 |
| 2017/0329408 | A1 | 11/2017 | Harris | |

OTHER PUBLICATIONS

U.S. Appl. No. 16/607,235, filed Oct. 22, 2019, Christian Bolzmacher et al.
U.S. Appl. No. 16/607,307, filed Oct. 22, 2019, Charles Hudin et al.
International Search Report dated Apr. 17, 2019 in PCT/FR2018/053478 filed on Dec. 20, 2018, 3 pages.
Preliminary French Search Report dated Sep. 26, 2018 in French Application No. 1762877 filed on Dec. 21, 2017, 2 pages.
Bai et al., "Impact localization combined with haptic feedback for touch panel applications based on the time-reversal approach", Journal of Acoustical Society of America, 2011, vol. 129, No. 3, XP012136380, pp. 1297-1305.
Woeckel et al., "Modelling of time reversal for localized tactile feedback on displays", Procedia Engineering, 2015, vol. 120, XP029268365, pp. 302-305.
Hudin et al., "Localized Tactile Feedback on a Transparent Surface through Time-Reversal Wave Focusing", IEEE Transactions on Haptics, 2015, vol. 8, No. 2, XP011584737, pp. 188-198.
Nicolau et al., "HoliBraille: Multipoint Vibrotactile Feedback on Mobile Devices", 2015, 4 total pages.
Tanter et al., "Optimal focusing by spatio-temporal inverse filter. I. Basic principles", Journal of Acoustical Society of America, 2001, vol. 110, No. 1, 12 total pages.
Benall-Khoudja et al., "VITAL: An electromagnetic integrated tactile display", Displays, 2007, vol. 28, pp. 133-144.

* cited by examiner

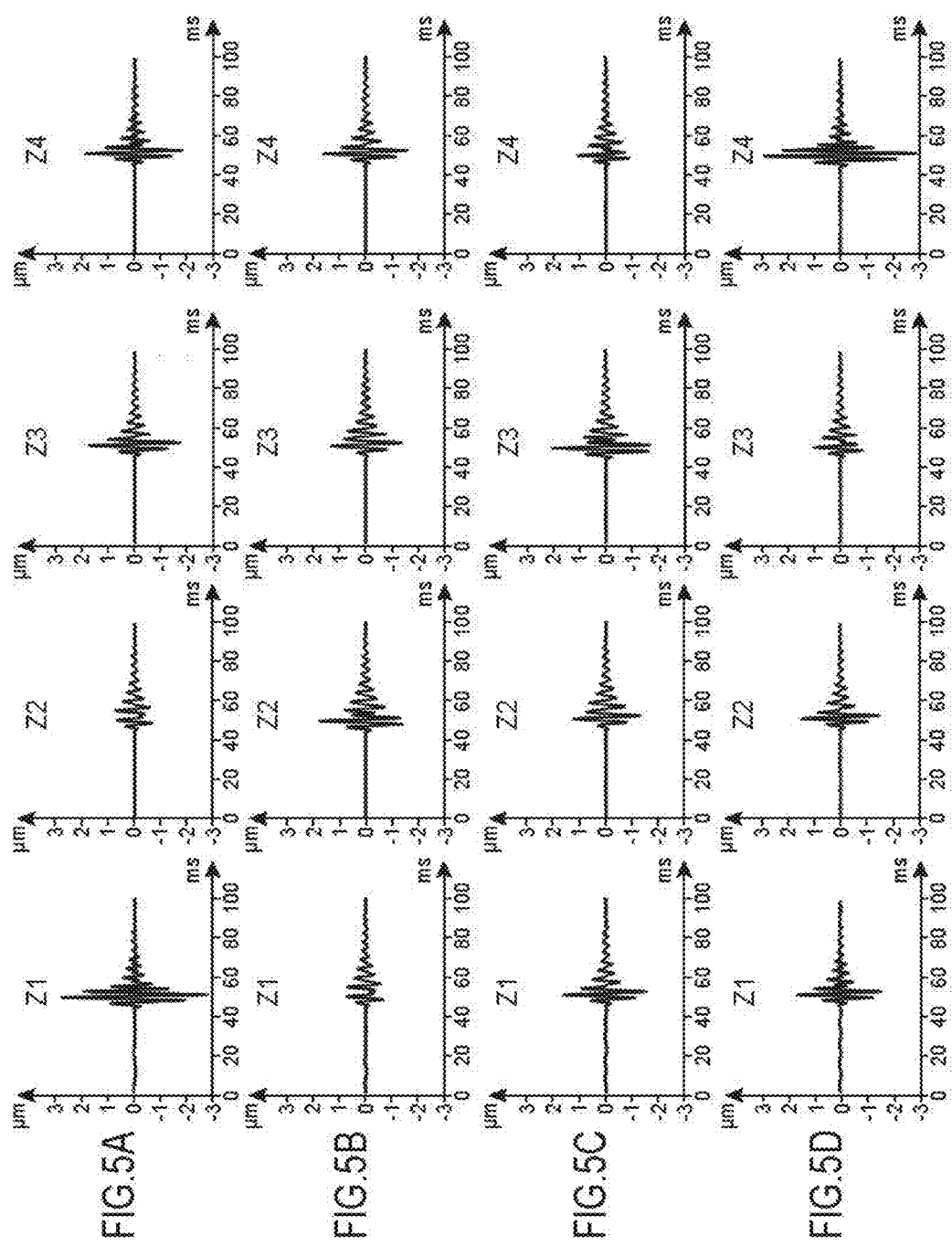

AREAL DEVICE OFFERING IMPROVED LOCALIZED DEFORMATION

TECHNICAL FIELD AND PRIOR ART

The present invention relates to an areal device offering improved localized deformation, and in particular to a tactile stimulation interface offering improved localization of the stimulation.

A tactile stimulation interface is designed to reproduce tactile information such as a texture, a relief, a variable roughness in time and/or space, an illusion of pressing on a flexible material, pressing a key, etc.

Such interfaces are used for example in the field of human-machine interfaces. They can also be used in the fields of optics, acoustics, chemistry and automated manufacturing, etc.

A tactile interface comprises a surface provided with a screen for example. A user interacts with the interface by applying one or more fingers onto the interface, for example to make a selection by pressing the representation of a key. On the one hand, it is desirable to be able to reproduce the selection, "the click", in a realistic manner. On the other hand it is desirable for the user to be able to have several fingers in contact with the interface, to be able to perform a mulitidigital interaction with the interface and feel sensations that are distinct from one from another.

There are tactile interfaces which use one or more actuators below the tactile surface, for example electromagnetic or piezoelectric actuators, designed to make the whole surface vibrate. If several fingers are in contact with the surface, they all feel the same sensation.

There are also interfaces which comprise a matrix of actuators, each one dedicated to stimulation in an area of the interface. The finger is either directly in contact with the actuators, or separated by a flexible surface which can deform locally. Said devices do not make it possible to achieve localized feedback on a rigid surface of the panel type, such as a track pad.

By replacing the flexible surface with a rigid panel, for example a glass panel, the vibrations produced locally by an actuator are propagated and reverberate through the whole surface. These vibrations are then felt by all of the fingers, even if a single actuator below a given finger has been activated.

Furthermore, if several actuators are activated to stimulate several fingers simultaneously, the effects of the vibrations of each actuator are added to that of the other actuator, in the areas where one wishes to actually generate a stimulation, and also in the other areas. Thus even the stimulated fingers experience a "tainted" stimulation.

There are tactile interfaces which use the method of time reversal, described for example in document C. Hudin, J. Lozada, and V. Hayward, "*Localized Tactile Feedback on a Transparent Surface through Time-Reversal Wave Focusing*", IEEE Transactions on Haptics, vol. 8, no 2, p. 188 198, April 2015. This interface makes it possible to localize the stimulation. The interface comprises a glass panel and actuators arranged in contact with and at the periphery of the glass panel. The piezoelectric actuators propagate acoustic waves into the glass panel. The use of a method of time reversal has the advantage of making it possible to generate a vibration in a localized manner on the surface of the panel and makes it possible to stimulate the different fingers separately, said tactile feedback is also referred to as "mulitouch localized tactile feedback". This interface is satisfying, however this interference requires frequencies typically between 20 kHz and 150 kHz. Thus an audible sound is generated when the finger or fingers are in contact with the panel, which produces less-natural sensations than the low frequency vibrations such as those produced by the mechanical response of a push of a button. Indeed, the low frequency vibrations in the range of tactile sensitivity, generally between 0 kHz and 1 kHz, when they are correlated with an action of the user, such as a force, a displacement, a contact, make it possible to simulate the presence of keys or a relief on the surface of a screen.

Document H. Nicolau, K. Montague, T. Guerreiro, A. Rodrigues, and V. L. Hanson, "*HoliBraille: multipoint vibrotactile feedback on mobile devices,*" 2015, pp. 1-4 proposes solving the problem by placing an actuator below each finger and mechanically separating each actuator by a surface absorbing vibrations. The activation of an actuator then produces a stimulus detected solely by the finger in direct contact. In this case the finger is therefore in direct contact with the actuator and not with the tactile surface with which it interacts. Furthermore, the sufficient absorption of low frequency vibrations requires a large volume of foam, which is not very compatible with the structural restrictions of a mobile device, such as a touch tablet or a mobile phone such as a smartphone.

DESCRIPTION OF THE INVENTION

Consequently, an aim of the present invention is to provide an areal device offering improved localization of the deformation of its surface.

An aim of the present invention is also to provide a tactile stimulation interface making it possible to generate localization of improved stimulations, at the same time having a smooth surface.

The aim outlined above is achieved by a tactile stimulation interface comprising a surface designed to be explored by touch by a user and at least one actuator designed to generate vibration in an area of the surface where one wishes to generate a tactile stimulation, control means of the said at least one actuator comprising means for calculating control signals using an inverse filtering operation, and sending control signals to the actuator. The inverse filtration makes it possible to compensate for the effects of propagation.

In one embodiment using a plurality of actuators, each located below an area of the surface, when one wishes to stimulate a finger situated above one of the actuators, the actuator is activated, but the other actuators situated below the fingers that one does not wish to stimulate are also activated so as to cancel vibrations in these areas. Furthermore, the actuator activated for actually stimulating a finger is controlled taking into account the activation effect of other actuators.

In another embodiment of the interface using a plurality of actuators, the finger or fingers are not situated above one or more actuators and when one wishes to stimulate a finger, all of the actuators receive a signal on the one hand for generating a vibration of the area of the surface in contact with the finger to be stimulated and on the other hand for cancelling vibrations in the areas of the surface in contact with the other fingers that one does not wish to stimulate. In this embodiment, the control points are not colocalized with the actuators.

In other words, the invention does not prevent the transmission or the propagation of waves over the whole of the surface but by means of different actuators cancels vibrations at the points where one does not wish to generate stimulation. The actuators are therefore used both to produce vibrations designed to generate a desired stimulation and to cancel vibrations.

The invention therefore makes it possible to compensate for the reverberation of waves and their propagation which involves a cross talk, i.e. a pollution of the desired displacement at a point given by the signal sent to another actuator at another point of the panel.

The use of this inverse filter therefore makes it possible to obtain, in different areas of the surface, with actuators located below these areas, a portion of the latter or none of them, a corrected displacement of the effects of dispersion and reverberations.

By means of the invention, the displacement obtained in the area on which the finger to be stimulated is located is independent of the displacements obtained at the centre of the other actuators. The other fingers are then not stimulated. It is then possible to form a multidigital tactile interface by separating the stimulations from one area to the other.

The present invention also applies to the case of an interface to an actuator. Indeed, the generation of the control signals of the single actuator makes it possible to compensate for the distortion of the signal due to the response of the actuator and the reverberation of waves in the surface.

The tactile interface has a layout adapted to tactile applications, its volume is not increased relative to existing interfaces. Indeed, the actuators can be bonded directly to the tactile surface and the damping of vibrations is no longer necessary, the use of voluminous insulation means is therefore no longer required.

The subject-matter of the present invention is therefore an areal device with localized deformation comprising a panel having an interactive surface with one or more exterior interactive elements, comprising at least one interactive area with the exterior, at least one actuator is able to cause a deformation in a direction orthogonal to the plan of the panel in the interactive area, control means of said at least one actuator configured to send control signals to said actuator, comprising calculation means of said control signals, said calculation means using an inverse filtering operation, so as to emit from a desired displacement of said area, control signals compensating at least partly the distortion, reverberation and propagation of waves.

Preferably, the interactive surface comprises a plurality of interactive areas arranged relative to one another so that they cover substantially the whole of the interactive surface and at least as many actuators as interactive areas, said calculation means using an inverse filtering operation, so as to emit from one or desired displacements from one or more interactive areas, control signals compensating at least partially the distortion, reverberation and propagation of waves.

In one embodiment the actuator or actuators are arranged below said interactive area or areas, opposite the interactive surface.

Preferably, the surface of the actuator or actuators corresponds substantially to that of the interactive element or elements designed to come into contact with the interactive surface.

In the case where the elements are fingers, the surface of the actuator or actuators is advantageously between 1 cm$^2$ and several cm$^2$.

In another embodiment, the interactive area or areas are remote from the actuator or actuators in the plane of the interactive surface.

In a very advantageous manner, the device comprises means for detecting contact between at least the interactive area and an external interactive element, and in a preferred manner, means for detecting contact between the external interactive element or elements and all of the interactive areas.

The device can comprise means for measuring the bearing force of the external element or elements with the interactive area or areas for determining the desired stimulation.

For example, the interactive areas and the actuators have a hexagonal form, which makes it possible to optimise the coverage of the interactive surface.

In one embodiment the actuators are piezoelectric actuators. The actuators can comprise thin transparent films, making them suitable for the manufacture of tactile screens.

In another embodiment, the actuators are electromagnetic actuators each comprising a coil and a magnet, the magnet or the coil being able to exert force on the panel.

In one embodiment, at least a part of each actuator is fixed directly to the panel.

The device can comprise a screen located below the panel opposite the interactive surface. The screen can be fixed to the panel opposite the interactive surface. The actuators can be fixed onto the screen opposite the face of the screen in contact with the panel.

The subject-matter of the present invention is also an interface for tactile stimulation comprising a device according to the invention.

The subject-matter of the present invention is also a track pad comprising a device according to the invention.

The subject-matter of the present invention is also a method of functioning of an areal device with a localized deformation comprising a panel having an interactive surface with one or more external interactive elements, comprising at least one interactive area with the exterior, at least one actuator in contact with the interactive surface and able to cause a deformation in a direction orthogonal to the plane of the panel, comprising:
    detecting a contact between said interactive area and the exterior interactive element,
    selecting a desired displacement of said interactive area,
    generating a control signal by means of an inverse filtering operation from the desired displacement,
    applying the control signal to said actuator.

The subject-matter of the present invention is also a method of functioning of an areal device with localized deformation comprising a panel having an interactive surface with one or more exterior elements, comprising interactive areas with the exterior, actuators in contact with the interactive surface and capable of causing deformation in a direction orthogonal to the plane of the rigid panel, comprising:
    detecting one or more contacts between said interactive areas and the interactive elements,
    selecting a desired displacement for each of said interactive areas,
    generating control signals by means of an inverse filtering operation from desired displacements,
    applying control signals to at least a portion of actuators located below areas for which an effective displacement is desired.

In an example of functioning, all or a portion of the actuators are arranged below the interactive areas, and control signals are applied to all or a portion of the actuators located below an interactive area with which contact with an external element has been detected.

BRIEF DESCRIPTION OF THE DRAWINGS

The present invention is explained on the basis of the following description and the accompanying drawings in which.

DETAILED DESCRIPTION OF PARTICULAR EMBODIMENTS

In the following description, the invention is described in more detail with reference to an application on a tactile interface, but the present invention applies to other fields, such as for example micromanipulation or optics.

In the case of a tactile interface, it is considered that the user is interacting with the tactile interface with its fingers. It should be understood that it could interact with other parts of its body.

In the present application, the terms "interactive area", "stimulation area" and "control point" are synonymous.

Figure 1:
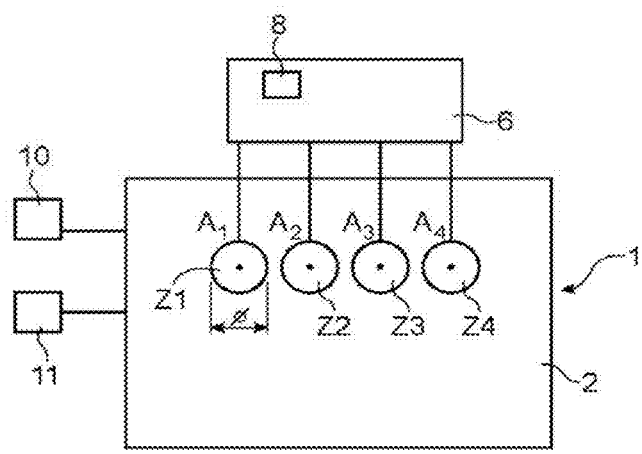
FIG. 1 is a top view of a schematic representation of a tactile interface using four actuators, according to a first embodiment of the present invention.

FIG. 1 shows a schematic representation of a view from above of a first embodiment of a tactile interface according to the invention, comprising a panel 1, made of glass for example, bearing on one of its faces the interactive surface with the exterior, designated the tactile surface, four actuators A1, A2, A3 and A4 arranged below the glass panel, for example fixed onto the surface of the panel 1 opposite the tactile surface 2. The tactile interface also comprises means for controlling 6 each of the actuators comprising calculation means 8 for control signals.

The material of the panel is selected such that it permits low frequency vibrations, typically lower than <1 kHz, to propagate several cm. The material can be a flexible or rigid material.

The actuators are such that they are able, when they are activated, to exert force on the panel in a direction out of the plane, i.e. orthogonal to the plane of the panel. The plane of the panel is the plane extending parallel to its greatest surface. FIGS. 7A to 7D show several examples of the interface according to the invention shown from the side. The actuators are able to exert force towards the top and/or the bottom in the representation of FIGS. 7A to 7D.

As described in the following, the actuators can be in direct contact with the panel or not.

In the example represented, the actuators are aligned along an axis.

The actuators are for example piezoelectric actuators.

The user is meant to interact with the tactile surface 2, for example by pressing certain points of the surface designated Z1, Z2, Z3, Z4. The actuators A1 to A4 are arranged perpendicular to the areas Z1 to Z4 respectively and are designed to be activated to tactilely stimulate fingers in contact with the areas. The surface of areas Z1 to Z4 is also the surface of the actuators A1 to A4.

Preferably, the surface of the actuators corresponds to the surface with which the fingers come into contact with the tactile surface, such that a single finger is in in contact at the same time with an area Z1 to Z4. For example, the exterior dimensions of an actuator are in the order of cm, for example a disk with a diameter in the order of cm or a square in the sides in the order of cm. Thus the surface of the actuators via which they are going to act on the panel is preferably between 1 cm$^2$ and several cm$^2$.

For example the actuators have the form of a disk with a diameter Φ2 cm, and for example the tactile surface has a length of 15 cm and a width of 10.5 cm.

Figure 6:
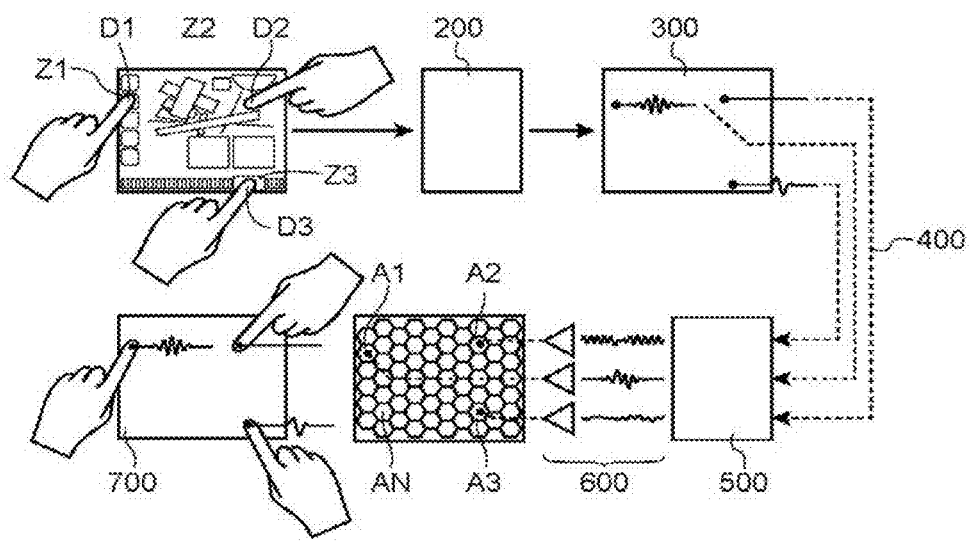
FIG. 6 is a schematic representation of the functioning steps of a tactile interface according to another example of the present invention.

As described in the following, the invention can activate the actuators so as to control the tactile stimulation of each area located above an actuator. The greater the surface covered by the actuators, the better the tactile stimulation is controlled on the tactile surface. The actuators can have any form, in the form of a polygonal disc. For example, the actuators have a hexagonal form so as to ensure maximum coverage below the tactile surface as represented in FIG. 6.

The calculation means 8 execute an operation of inverse filtration to determine the control signals. The calculation means also execute an algorithm for synthesising vibrations determining the desired signal in an area as a function of the desired stimulation in this area, and taking into account for example the pressing force on said area, the speed of movement of fingers as described below. This type of algorithm is well known to a person skilled in the art and will not be described in detail.

An example is now described of the functioning of a tactile interface without calculation means 8 applying an inverse filtering operation, and with calculation means 8 applying the inverse filtering operation. In this example it is desirable to obtain displacements in areas Z1 to Z4 represented in FIG. 2, which have been determined by the vibration synthesis algorithm. In area Z1, a sine window type displacement "burst" of 5 cycles of oscillation at 300 Hz is desirable and no displacement in areas Z2 to Z4, i.e. no vibration.

Figure 3A:
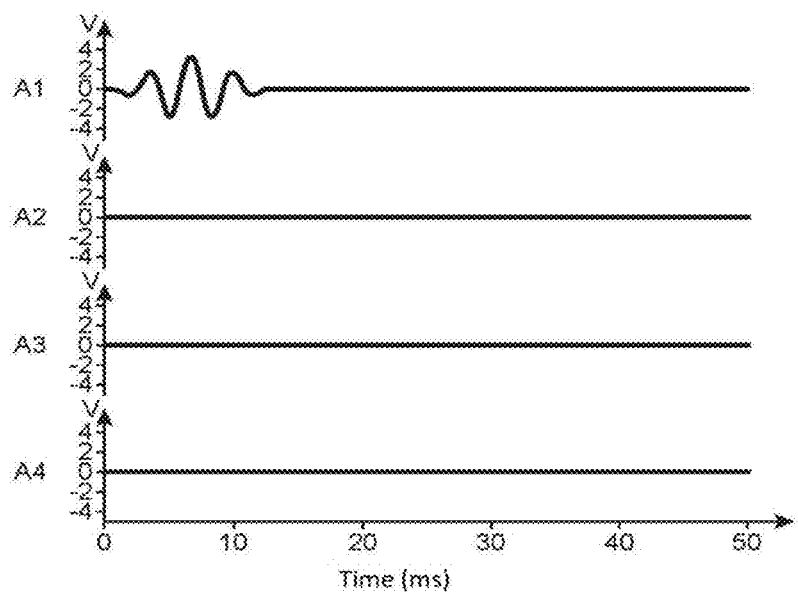
FIG. 3A represents graphically the signals emitted in V as a function of time in ms, for actuators A1 to A4 for an interface of the prior art to obtain the displacement of FIG. 2.

In FIG. 3A, the control signals are shown in Volt as a function of time in ms emitted and sent to actuators A1, A2, A3 and A4 in a tactile interface of the prior art. Only one signal is sent to the actuator A1 which is identical to the desired displacement and no signal is sent to actuators A2, A3 and A4.

In FIG. 5A, the displacements measured in μm are shown as a function of time in ms in areas Z1, Z2, Z3 and Z4 resulting from the signals of FIG. 3A.

Figure 2:
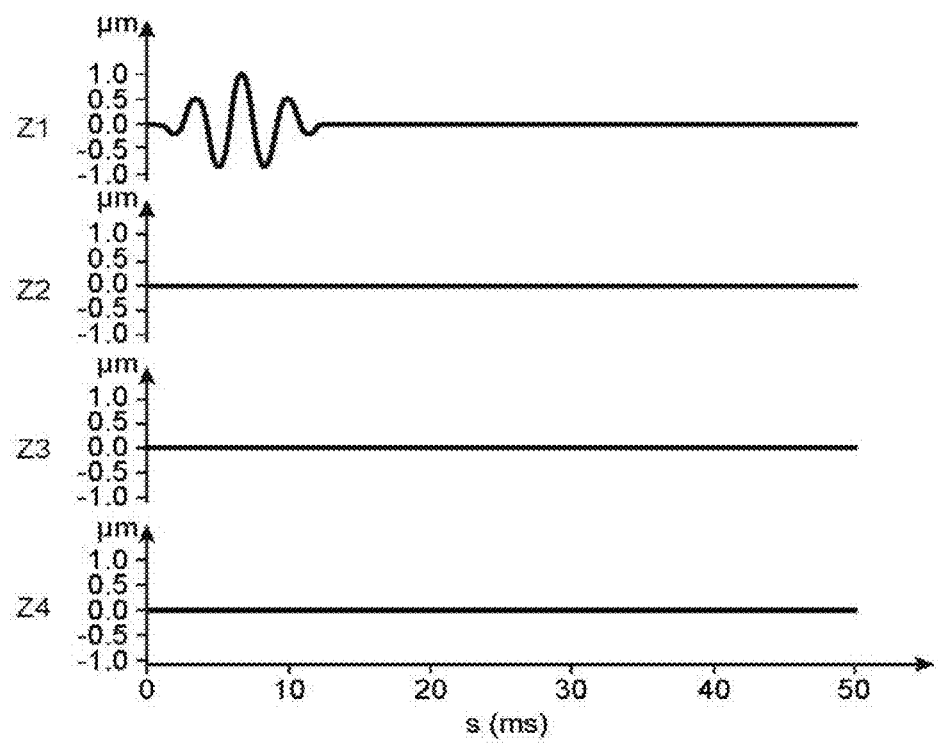
FIG. 2 is a representation of the desired displacement in μm as a function of time in ms.

It should be noted that on the one hand the displacement measured in area Z1 corresponds to the deformed control signal and has additional oscillations due to the reflections of waves produced by the panel and their propagation, therefore it does not correspond to the desired displacement represented in FIG. 2.

On the other hand, it is noted that displacements of non-zero value are measured in areas Z2 to Z4, when no displacement was desired in said areas. Furthermore, these displacements are not negligible. Thus if a user has one or more fingers on areas Z2, Z3 and/or Z4, an undesired tactile stimulation will be felt. The user could then feel false information.

The graphic representations of FIGS. 5B, 5C and 5D show the displacements measured in all areas during the activation of actuators A2, A3 and A4 respectively by applying the signal of FIG. 3A which has been applied to A1.

It should be noted therefore that by applying a control signal which corresponds directly to the desired displacement, there is on the one hand a difference between the displacement desired in one area and the displacement obtained and on the other hand non-desired tactile stimulations are generated.

According to the invention, the calculation means execute inverse filtering, which makes it possible to better control the displacements in each of the areas, that these displacements are zero or not.

Figure 3B:
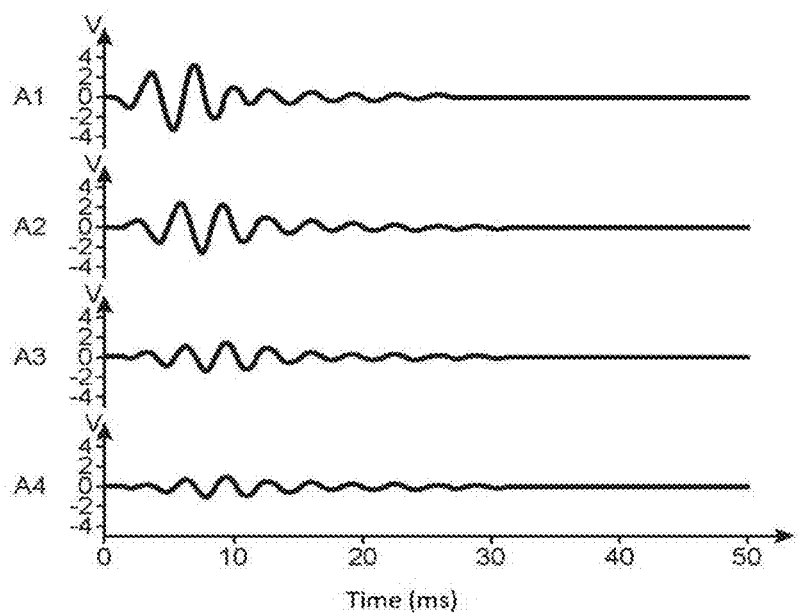
FIG. 3B represents graphically the signals emitted in V as a function of time in ms, for actuators A1 to A4 for an interface according to the invention to obtain the displacement of FIG. 2, FIG. 4A are graphic representations of the displacement measured in the centre of an area above each actuator, by activating actuators A1 to A4 of the interface of FIG. 1 with the signals of FIG. 3B, FIGS. 4B to 4D are graphic representations of the displacement measured at the centre of areas Z1 to Z3 when the displacement of FIG. 2 is desired in areas Z2, Z3, Z4 respectively, by activating the actuators A2, A3, A4 of the interface of the FIG. 1, FIG. 5A are graphic representations of the displacement measured at the centre of an area above each actuator, by activating actuators A1, A2, A3 and A4 with the signals of FIG. 3A, FIGS. 5B to 5D are graphic representations of the displacement measured at the centre of areas above each actuator, when the desired displacement of FIG. 2 is desired in areas Z2, Z3, Z4 respectively, by activating the actuators A2, A3, A4 of the interface of the prior art.

FIG. 3B shows the control signals emitted and sent to actuators A1, A2, A3 and A4 in a tactile interface according to the invention to obtain the desired displacement of FIG. 2. All the actuators are activated, not only actuator A1, and the signal sent to A1 is not identical to the desired displacement, it is complex and is such that it compensates for the effects of other actuators and reflection effects.

Figures 4A, 4B, 4C, 4D:
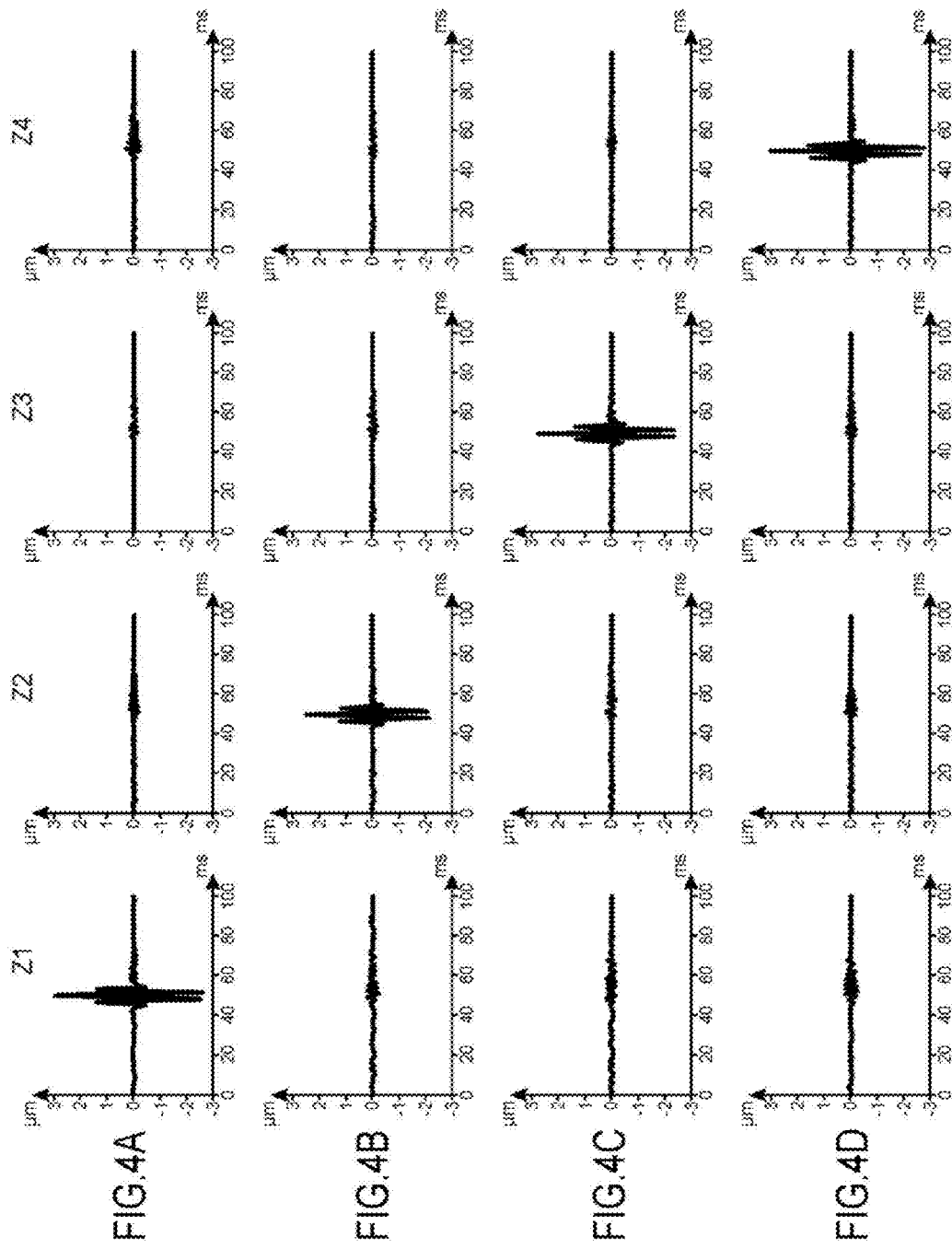

FIG. 4A shows the measured displacements resulting from the signals of FIG. 3B in each area Z1 to Z4. It should be noted that the displacement measured in Z1 corresponds to that which is desired and that the displacements measured in other areas or no displacement desired are virtually zero. Thus if the user puts his finger on one of areas Z2 to Z4 no tactile stimulation is felt or only a very small amount of tactile stimulation. The information transmitted to the user is therefore correct.

FIGS. 4B to 4D show displacements measured in all the areas during the activation of actuators A2, A3 and A4 respectively by applying the signal of FIG. 3B which was applied to A1. It should be noted that the displacements measured in Z2, Z3 and Z4 correspond to desired displacements, and that the displacements measured in other areas where no displacement is desired are virtually zero.

By means of the inverse filtering operation, the control signals are those for the areas for which no stimulation is desired, they activate the actuators corresponding to these areas, at least those below the areas with which a finger is in contact, such that it generates vibrations with the aim of cancelling those resulting from propagation of the activation of the actuator below the area where one wishes to generate stimulation.

The calculation of the control signal of the actuator below the area where one wishes to generate stimulation takes into account both the desired displacement and the effect of propagation and reflection of vibrations produced by other actuators. According to the invention, each actuator is therefore controlled taking into account the external environment.

It is also possible in each area covered by an actuator to obtain a displacement which may be zero, corrected by effects of distortions and reverberations, and independent of the displacements in the centre of other areas.

We will now describe the operation of inverse filtration. Such an operation is described for example in the article "*Optimal focusing by spatio-temporal inverse filter. I. Basic principles*" M. Tanter et al., *The Journal of the Acoustical Society of America* 110, 37 (2001) applied to image processing in medical imaging.

The R reponse of a linear system at excitation E is given by the relationship R=H.E, with H the transfer function of the system. In the application at a tactile interface, the displacement $U_i$ of the panel measured at the centre of an actuator i is observed as a response to a signal $S_j$ sent to an actuator j. Therefore:

$$U_i(\omega) = H_{ij}(\omega) S_j(\omega)$$

with $H_{ij}(\omega)$ the transfer function between the signal sent to the actuator i and the displacement recorded at the centre of the actuator j. If N actuators emit simultaneously, the displacement obtained is the sum of contributions of these N actuators:

$$U_j(\omega) = \sum_{i=1}^{N} H_{ij}(\omega) S_j(\omega)$$

in matrix form:

$$\begin{bmatrix} U_1 \\ U_2 \\ \vdots \\ U_N \end{bmatrix}_\omega = \begin{bmatrix} H_{11} & H_{12} & \ldots & H_{1N} \\ H_{21} & H_{22} & \ldots & H_{2N} \\ \vdots & \vdots & \ddots & \vdots \\ H_{N1} & H_{N2} & \ldots & H_{NN} \end{bmatrix}_\omega \cdot \begin{bmatrix} S_1 \\ S_2 \\ \vdots \\ S_N \end{bmatrix}_\omega$$

or $$\mathbb{U}_\omega = \mathbb{H}_\omega \cdot \mathbb{S}_\omega$$

The displacement $u_i$ at the centre of an actuator i is therefore not proportional to signal $s_i$ which is applied thereto but is filtered by the response of the actuator bonded to the panel $H_{11}$ and depends, via the terms $H_{11}$, on signals sent to other actuators which produce waves propagating into the whole panel.

The inverse filtering consists of inversing this relationship by calculating the signal to be applied to the set of actuators to obtain the desired displacement. By noting $$\mathbb{V}_\omega = \begin{bmatrix} V_1 \\ V_2 \\ \vdots \\ V_N \end{bmatrix}_\omega$$

the desired displacement, in the frequency domain, to all of the positions, the signal $$\mathbb{S}_\omega = \begin{bmatrix} S_1 \\ S_2 \\ \vdots \\ S_N \end{bmatrix}_\omega$$

to be sent to each of the actuators is calculated by the relationship:

$$\mathbb{S}_\omega = \mathbb{H}_\omega^{-1} \cdot \mathbb{V}_\omega$$

Finally a displacement $\mathbb{U}_\omega$ is obtained, given by:

$$\mathbb{U}_\omega = \mathbb{H}_\omega \cdot \mathbb{S}_\omega = \mathbb{H}_\omega \cdot \mathbb{V} \cdot \mathbb{H}_\omega^{-1} = \mathbb{V}_\omega$$

In this way a displacement is obtained consistent with one expected $\mathbb{U}_\omega = \mathbb{V}_\omega$.

By inversing the matrix all of the effects are compensated for, before generating control signals to obtain the desired displacement despite the distortions, reverberations and propagations of waves.

This filter is temporal, in that it performs a transformation of the amplitude and the phase at all frequencies, and spatial as it takes into account the signals emitted by all of the actuators.

Preferably, the interface comprises detection means 10 for detecting the presence of a finger on an area for on the one hand determining whether a stimulation is to be generated and on the other hand for activating the actuators below the areas which do not have to be activated. The detection means used are those usually used in the tactile area, for example they are capacitive, resistant, infrared in type. In one variant, one can settle for not detecting the finger on the stimulation area and control the actuators of all of the other areas in order to limit or even cancel their displacement. However, this activation consumes energy and computing power.

According to another variant, the interface does not comprise means for detecting the presence of a finger, it is then possible to produce a vibration in an area without knowing effectively if a finger is located on said area. The control of vibrations is performed by supposing that all positions are being touched.

In an advantageous manner, the interface comprises means 11 for measuring the pressure force of fingers on the areas, the value of the pressure force can then be taken into account advantageously to simulate more accurately the response of a touch or a button. The means for measuring the force include for examples piezoelectric, piezoresistant, capacitive means, the value of the pressure force is taken into account by the algorithm for synthesising vibrations for determining the desired displacement in an area and not during the step of inverse filtration.

In an equally advantageous manner, the speed of the finger or fingers on the tactile surface is also measured and taken into account by the algorithm for synthesising vibrations to determine the form of the signal that one wishes to obtain.

By taking into account the pressure force and the speed of movements, the stimulation is then more realistic.

FIG. 6 shows a schematic representation of an example of functioning of calculation means and control means of another example of a tactile interface.

In this example, the interface comprises a plurality of actuators A1, A2, A3 . . . AN in a hexagonal form covering almost all of the surface opposite the tactile surface. Thus regardless of the position of the fingers on the surface tactile, the displacement of the area with which a finger is in contact can be controlled by the activation of the actuator located below said area.

In FIG. 6 three tactile stimulations are produced in three distinct areas, which can be identical or different. Three fingers D1, D2, D3 are in contact with the tactile surface in three distinct areas Z1, Z2, Z3. Indeed, the calculation of the control signals can be performed when one wishes to stimulate in at least two distinct areas. In this functioning mode the displacement of areas is zero apart from areas Z1, Z2 and Z3. The calculation of the control signals is performed by applying an inverse filtering.

The presence of fingers on areas Z1, Z2 and Z3 is detected and possibly their pressure force on areas Z1, Z2 and Z3 is measured.

Each area is associated with one or more stimulations stored in a memory of the control means, this stimulation can vary as a function for example of the pressure force. For example, the stimulation can be such that it reproduces the displacement of a keyboard button which is depressed, a validation button, of the click type; the transitory vibrations produced when bearing on a deformable surface can also be reproduced. It is shown that the screen comprises patterns corresponding to different commands.

The control means synthesise received information (step 200), and then determine the desired vibration (step 300) which was associated with a stimulation during the programming of the interface.

The desired vibrations are then used for the input (step 400) to the inverse filter of calculation means 8 which determine the control signals at least of actuators A1, A2 and A3 (step 500). The signals are amplified advantageously and are then sent to actuators A1, A2 and A3 (step 600). They then produce compatible vibrotactile feedback (step 700).

The interface according to the invention can only comprise a single actuator, indeed the calculation of the control signal of the single actuator by inverse filtration makes it possible to compensate the distortion of the signal due to the response of the actuator at its own vibration and the reverberation of waves in the surface.

The interface according to the invention makes it possible to operate at all frequencies and not just at frequencies of tactile sensitivity lower than 1 kHz, however the latter are advantageous as they do not produce sound during the activation of the actuators. Thus different types of actuators can be used. The piezoelectric actuators are adapted to high and low frequency functions.

A piezoelectric actuator comprises a piezoelectric material in the form of a panel, for example made of lead zirconate titanate (PZT) or AlN (aluminium nitride), and electrodes on either side of the panel and in contact with the latter, to apply a current causing the deformation of the piezoelectric material.

By means of the invention, it is also possible to give the surface a controlled profile. Indeed, a permanent deformation of the surface can be seen as a zero frequency vibration. It is also possible to apply the method of inverse filtration. By exerting localized pressure force on a panel, the whole of the surface is deformed. By applying the method of inverse filtration, it is possible to cancel this deformation at desired points.

Electromagnetic actuators are possible. They are adapted to low frequency functioning. Such actuators are described for example in the document Benali-Khoudja and al.—2007 —*VITAL An electromagnetic integrated tactile display*". The actuators each comprise for example a fixed coil and a magnet bonded below the tactile surface. The current signal sent into the coils is calculated by inverse filtration.

FIGS. 7A to 7D, show several examples of the structure of the tactile interface applicable to the present invention.

Figure 7A:
FIGS. 7A to 7D are cross-sectional views in a plane orthogonal to the plane of the tactile surface of different embodiments of structures of a tactile interface according to the present invention.

In FIG. 7A the actuators A1, A2 . . . AN are fixed, for example by bonding directly onto the face of the panel 1 opposite the tactile surface 2. This structure is adapted to the formation of a track pad, indeed the actuators are not generally transparent. In the case of a track pad the tactile surface is generally opaque.

Figure 7B:
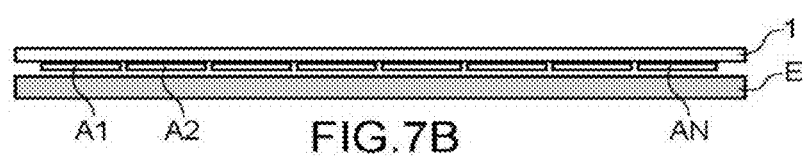

In FIG. 7B, the interface comprise a panel 1 provided with actuators as in FIG. 6A, and a screen E opposite the tactile panel. In this structure, advantageously actuators transparent are selected, for example piezoelectric actuators arranged in a thin layer.

Figure 7C:
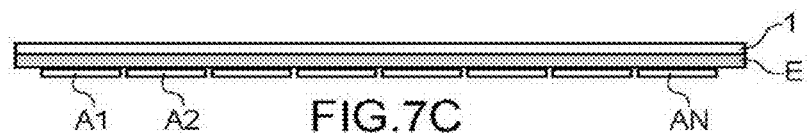

In FIG. 7C, the interface comprises a transparent panel 1, a screen E disposed directly below the panel 1 and connected to the latter, it is for example bonded to the panel 1, and actuators A1 . . . AN fixed to the screen on the face opposite the one oriented to the side of the panel. This configuration has the advantage of not needing transparent actuators. In this example, the actuators act on the tactile surface through the screen. The screen is for example an OLED screen which has the advantage of being very fine and is generally bonded directly to the tactile panel. This assembly has the advantage of providing good transmission of low frequencies.

Figure 7D:
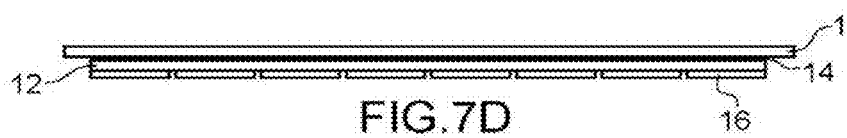

In FIG. 7D, the interface comprises a panel 1 and piezoelectric actuators A1 to AN on the face opposite the tactile surface. The actuators comprise in common a layer of piezoelectric material 12, a common electrode 14 between the layer 12 and the panel 1 and electrodes 16 on the opposite face of the layer 12 so as to form individual actuators.

Figure 8:
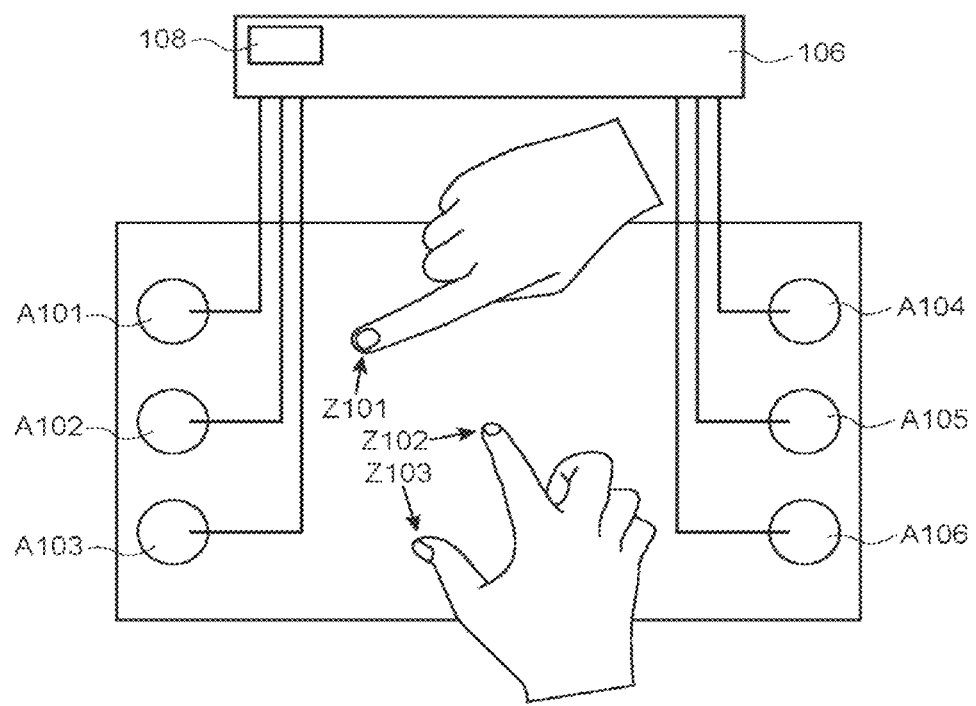
FIG. 8 is a view from above of a tactile interface according to a second embodiment of the invention.

FIG. 8 shows a view from above of a tactile interface according to a second embodiment.

In this embodiment, the finger or fingers to be stimulated, and therefore the areas of the surface to be stimulated are not situated above actuators.

In this example the actuators A101 to A106 are spread out along the edges of the tactile surface, three on each edge. The fingers are designed to come into contact with areas of the surface located between the two rows of actuators. These areas Z101, Z102, Z103 . . . are potential areas of stimulation. The arrangement of the actuators of FIG. 8 is not limiting, another arrangement is possible, for example distribution along the four edges of the panel, or on two non-parallel edges, non-symmetrical distribution, distribution in a circle in the case of a circular surface, etc.

The actuators can be arranged on or below the surface, for example bonded to the surface.

This embodiment is very advantageous in an application for a screen as it does not require the use of transparent actuators.

In a preferred manner, the actuators are arranged below the whole of the interactive surface. This arrangement makes it possible to minimise the distance between the control points where the fingers and the actuators can be located.

The potential stimulation areas are located in the near field of the actuators, i.e. the potential stimulation areas are located at a distance smaller than or equal to the dimension of the actuators in the plane or at the wavelength of control signals sent to actuators, the greatest distance being considered.

This configuration in near field enables an effective control by reducing the power of signals emitted to obtain given displacements, particularly when the control points are spaced apart less than one wavelength from one another.

Figure 9A:
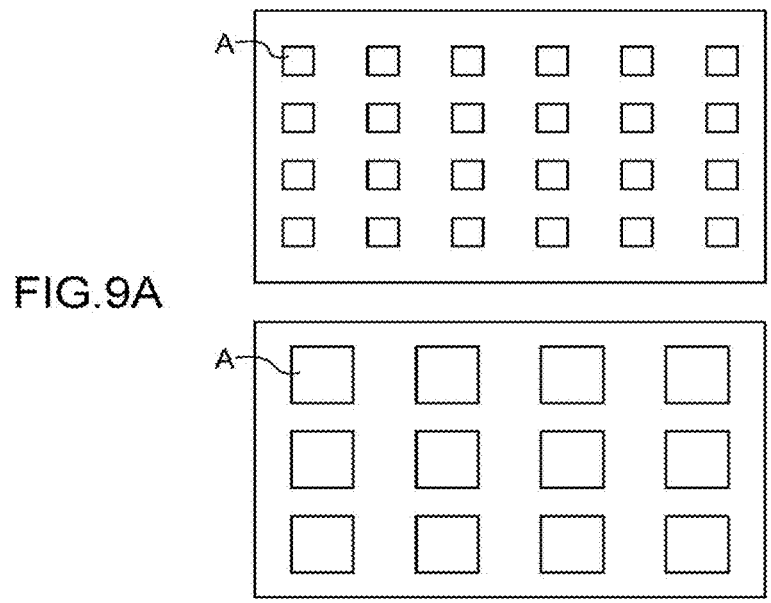
FIG. 9A is a schematic representation of two interfaces according to the invention with the matrix structure of actuators of two different sizes.
Figure 9B:
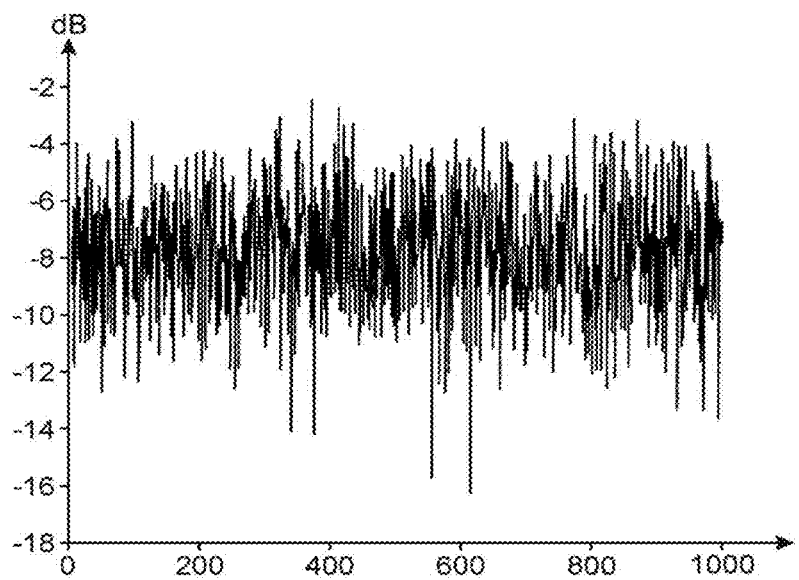
FIG. 9B is a graphic representation of the ratio of energy in dB of all of the control signals necessary for controlling two randomly arranged points on the panel for the two interfaces of FIG. 9A.

FIG. 9B shows the ratio of power in dB of all of the control signals necessary for the control of two points arranged randomly on the panel for matrix arrangements of actuators A of two different sizes indicated in FIG. 9A making it possible to arrange the control points in the near field of the actuators according to the invention.

Figure 10A:
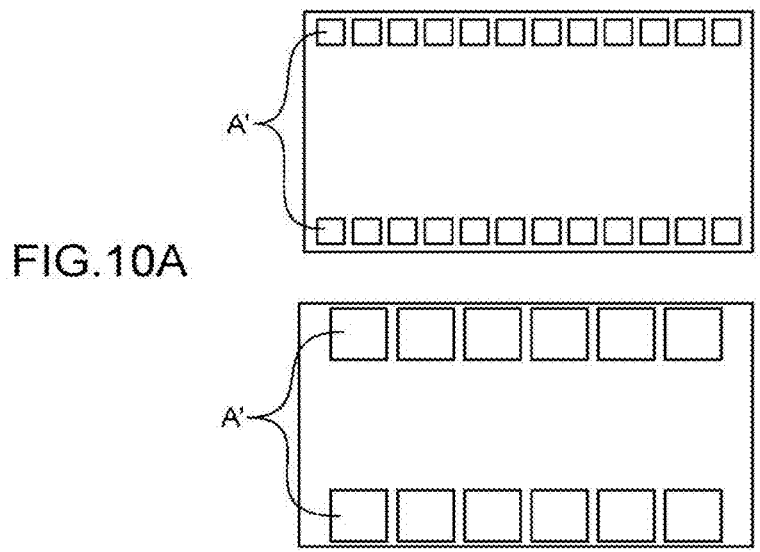
FIG. 10A is a schematic representation of two interfaces of the prior art in which actuators of two different sizes are arranged on the edges of the interface.
Figure 10B:
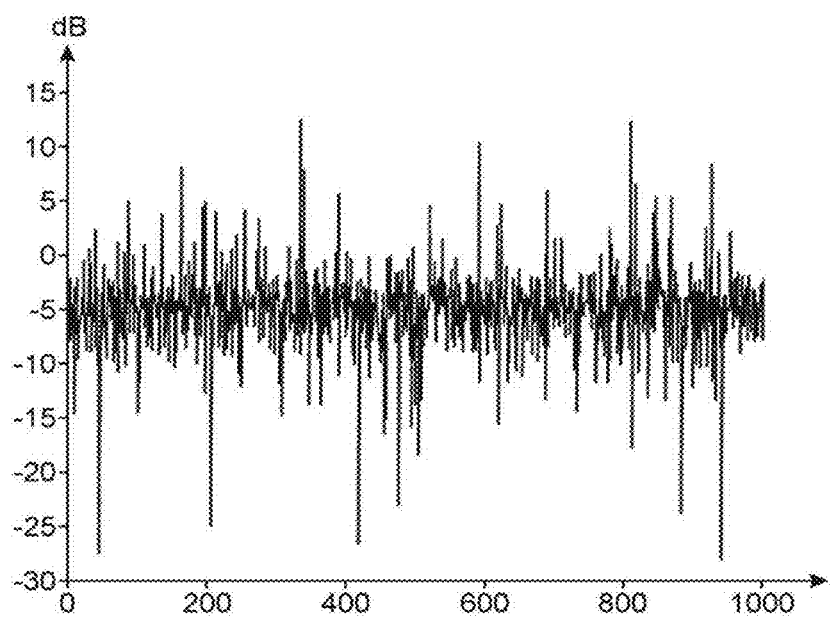
FIG. 10B is a graphic representation of the ratio of energy in dB of all of the control signals necessary for controlling two randomly arranged points on the panel for the two interfaces of FIG. 10A.

By way of comparison, FIG. 10B shows the ratio of power in dB of all of the control signals necessary for controlling two points arranged randomly on the panel for the arrangements of actuators A' of two different sizes located on the edge of the panel indicated in FIG. 10A, and for which the control points are not in the near field of the actuators.

These measures were performed using a glass panel of thickness 1 mm with a frequency range of the control signals covering the range of tactile sensitivity 0-1 kHz which corresponds to wavelengths of 10 cm. The actuators considered are piezoelectric ceramics of dimensions 10 mm and 20 mm. 1000 couples of points selected randomly but identical for the two simulations were tested. An average reduction of 5 and 8 dB respectively was noted for the two sizes of actuators used by means of the relative arrangement of the actuators and control points according to the invention, relative to an arrangement of the actuators on the edges of the panel.

The interface also comprises control means 106 comprising calculation means 108 using an inverse filtration operation, wherein the matrix regrouping the transfer functions between the signal sent to each actuator and the displacements recorded in the potential different areas of stimulation, cannot be a square matrix as the number of actuators and the number of potential stimulation areas can be different. To ensure the stability of the matrix inversion, the number of actuators is greater than or equal to the maximum number of areas to be stimulate simultaneously, i.e. in the case of an interface used with one or two hands the number of actuators is greater than or equal to the maximum number of fingers able to come into contact with the surface, 5 or 10 for example.

Preferably, the interface comprises means for detecting the contact of fingers on the different areas of the surface.

As with the first embodiment, the control of the actuators uses a matrix $H(\omega)$ established by functions of response in frequencies $H_p(\omega)$ linking the Q actuators to each of the P fingers.

Said functions of response in frequency can be obtained from a database of responses or interpolated from a reduced base of responses.

Then the matrix $\mathbb{H}_\omega^{-1}$ is calculated which is a pseudo-inverse of the matrix $\mathbb{H}_\omega$, as the matrix cannot be square, for each frequency of the bandwidth.

The mode of functioning of the control means is as follows, taking into account an interface with Q actuators and with P fingers likely to come into contact with the surface of the interface.

Firstly, the position of the finger or fingers on the interactive surface are determined by detection means similar to those described above in relation to the first embodiment.

According to the type of interaction all or some of the fingers on the surface are stimulated. In a following step, desired vibrations $v_p(t)$ are determined below each of P fingers. Said vibrations are arbitrary signals previously determined as a function of the information to be provided, possibly zero, determined so as to produce haptic feedback perceptible by the user and adapted to the context of interaction.

In a following step the desired vibrations are filtered by the inverse matrix $\mathbb{H}_\omega^{-1}$ to obtain control signals of the actuators.

In a following step, the control signals $s_q(t)$ of Q actuators are emitted and sent to the actuators.

For example, it is desirable that finger D1 is stimulated and that other fingers D2 and D3 are not stimulated. All the actuators A101 to A06 are controlled to generate stimulation in area Z101 and to counter any vibration which may appear in areas Z102 and Z103 and to optimise the stimulation in area Z101.

The mode of functioning of the interface according to the second embodiment is close to that of the interface according to the first mode.

As with the first embodiment, the stimulations to be generated can be modulated for example as a function of the bearing force of the finger or fingers on the surface. In one variant, the device cannot comprise means for detecting the contact or contacts of one or more fingers or other members.

In one variant, the interface comprises a single actuator.

In another embodiment, the interface is such that the areas of potential stimulation are located above actuators or not. The number of actuators is selected to be greater than the number of potential areas of stimulation.

The present invention is adapted in particular to human-machine interaction with a tactile surface. The present invention can also be used in applications in adaptive optics or micromanipulation, which requires greater control of the deformations and vibrations of a surface.

The present invention also applies to interfaces which do not have a planar surface, i.e. it applies to interfaces comprising complex curved surfaces, for example in the form of a shell.

The invention claimed is:

1. An areal device for localized deformation comprising:
a panel having an interactive surface with one or more exterior interactive elements, comprising at least one interactive area with the exterior;
at least one actuator capable of causing deformation in a direction orthogonal to the plane of the panel in the interactive area, the at least one interactive area being located in the near field of the actuator;
at least one detector for detecting the contact between the at least one interactive area and an exterior interactive element; and
control means of said at least one actuator being configured to send control signals to said actuator, comprising calculation means of said control signals, said calculation means executing an operation of inverse filtering, so as to emit from a desired displacement of said area, control signals at least partially compensating the distortion, reverberation and propagation of waves,
wherein the at least one interactive area is located with respect to the actuators at a smaller distance or a distance equal to a wavelength of the control signals and/or dimensions of the actuators in direction of the interactive surface.

2. The device according to claim 1, wherein the interactive surface comprises a plurality of interactive areas arranged relative to one another such that they cover substantially the whole of the interactive surface and a plurality of actuators, each of said interactive areas being located in the near field of at least one actuator, said calculating means executing an inverse filtering operation, so as to emit from a desired displacement or displacements of one or more interactive areas, control signals at least partially compensating the distortion, reverberation and propagation of waves.

3. The device according to claim 2, wherein the interactive surface comprises a plurality of interactive areas arranged relative to one another such that they cover substantially the whole of the interactive surface and at least as many actuators as interactive areas, said calculating means executing an inverse filtering operation, so as to emit from one desired displacement or displacements of one or a plurality of interactive areas, the control signals at least partially compensating the distortion, reverberation and propagation of waves.

4. The device according to claim 1, wherein the surface of the actuator or actuators is between 1 $cm^2$ and several $cm^2$.

5. The device according to claim 1, wherein the actuator or actuators are disposed underneath said interactive area or areas, opposite the interactive surface.

6. The device according to claim 1, wherein the interactive areas or areas are spaced apart from the actuator or actuators in the plane of the interactive surface.

7. The device according to claim 1, comprising means for detecting contact between at least the interactive area and an exterior interactive element.

8. The device according to claim 1, comprising means for detecting contact between the exterior interactive element or elements and all the interactive areas.

9. The device according to claim 1, comprising means for measuring the contact force of the exterior element or elements with the interactive area or areas.

10. The device according to claim 1, wherein the interactive surface comprises a plurality of interactive areas arranged relative to one another such that they cover substantially the whole of the interactive surface and a plurality of actuators, each of said interactive areas being located in the near field of at least one actuator, said calculating means executing an inverse filtering operation, so as to emit from a desired displacement or displacements of one or more interactive areas, control signals at least partially compensating the distortion, reverberation and propagation of waves, and wherein the interactive areas and the actuators have a hexagonal form.

11. The device according to claim 1, wherein the actuators are piezoelectric actuators.

12. The device according to the claim 11, wherein the actuators comprise thin transparent films.

13. The device according to claim 1, wherein the actuators are electromagnetic actuators, each comprising a coil and a magnet, the magnet or the coil being capable of exerting force on the panel.

14. The device according to claim 1, wherein at least a portion of each actuator is fixed directly to the panel.

15. The device according to claim 1, comprising a screen arranged underneath the panel opposite the interactive surface.

16. The device according to the claim 15, wherein the screen is fixed to the panel opposite the interactive surface.

17. The device according to claim 15, wherein the screen is fixed to the panel opposite the interactive surface, and wherein the actuators are fixed onto the screen opposite the face of the screen in contact with the panel.

18. The device according to claim 1, configured to interact with interactive elements of the given surface, wherein the surface of the actuator or actuators corresponds essentially to the given surface of the interactive elements.

19. The tactile stimulation interface comprising a device according to claim 1.

20. The track pad comprising a device according to claim 14.

21. A method of functioning of an areal device with localized deformation comprising a panel having an interactive surface with one or more exterior interactive elements, comprising at least one interactive area with the exterior, at least one actuator in contact with the interactive surface and capable of causing a deformation in a direction orthogonal to the plane of the panel, the at least one interactive area being located in the near field of the actuator, said method comprising:
  detecting a contact between said interactive area and the exterior interactive element;
  selecting a desired displacement of said interactive area;
  generating a control signal by means of an inverse filtering operation from desired displacements; and
  applying the control signal to said actuator,
  wherein the at least one interactive area is located with respect to the actuators at a smaller distance or a distance equal to a wavelength of the control signals and/or dimensions of the actuators in a direction of the interactive surface.

22. A method of functioning of an areal device with localized deformation comprising a panel having an interactive surface with one or more exterior elements, comprising interactive areas with the exterior, actuators in contact with the interactive surface and capable of causing a deformation in a direction orthogonal to the plane of the panel, each of said interactive areas being located in the near field of at least one actuator, the method comprising:
  detecting one or more contacts between said interactive areas and the interactive elements;
  selecting a desired displacement for each of said interactive areas;
  generating control signals by an inverse filtering operation from the desired displacements; and
  applying control signals to at least a portion of the actuators,
  wherein the interactive areas are located with respect to the actuators at a smaller distance or a distance equal to a wavelength of the control signals and/or dimensions of the actuators in a direction of the interactive surface.

23. The method of functioning according to claim 22, wherein all or a portion of the actuators are arranged below the interactive areas and wherein control signals are applied to all or a portion of the actuators located below an interactive area with which a contact with an exterior element has been detected.

* * * * *